United States Patent [19]

Hammond

[11] Patent Number: 5,081,492
[45] Date of Patent: Jan. 14, 1992

[54] EXPOSURE CONTROL SYSTEM

[75] Inventor: Thomas J. Hammond, Penfield, N.Y.

[73] Assignee: Xerox Corporation, Stamford, Conn.

[21] Appl. No.: 626,596

[22] Filed: Dec. 12, 1990

[51] Int. Cl.[5] ............................................. G03G 21/00
[52] U.S. Cl. .................................. 355/208; 355/214; 355/228
[58] Field of Search ............... 355/233, 228, 239, 208, 355/200, 71, 35, 75, 210, 214, 246

[56] References Cited

U.S. PATENT DOCUMENTS

| | | | |
|---|---|---|---|
| 3,654,893 | 4/1972 | Piper et al. | 355/246 X |
| 3,788,739 | 1/1974 | Coriale | 355/246 X |
| 3,898,001 | 8/1975 | Hardenbrook et al. | 355/200 |
| 3,947,117 | 3/1976 | Basu et al. | 355/68 |
| 3,995,954 | 12/1976 | Dir et al. | 355/71 |
| 4,298,275 | 11/1981 | Critchlow et al. | 355/71 |
| 4,519,694 | 12/1985 | Kashiwagi et al. | 355/71 X |
| 4,527,864 | 7/1985 | Dir | 350/337 |
| 4,603,946 | 8/1986 | Kato et al. | 350/331 R |
| 4,839,696 | 6/1989 | Ohtani | 355/208 X |
| 4,912,508 | 3/1990 | Zawadzski et al. | 355/208 |
| 4,990,955 | 2/1991 | May et al. | 355/208 |

FOREIGN PATENT DOCUMENTS 60-59376  4/1985  Japan .................................. 355/246

OTHER PUBLICATIONS

High Technology Magazine, p. 7, Published Jul. 1987 "Auto Mirrors Dim the Glare".

Primary Examiner—A. T. Grimley
Assistant Examiner—Shuk Y. Lee

[57] ABSTRACT

An exposure control system for a document copier is enabled by positioning a segmented variable reflectance mirror along the optical imaging path. The mirror segments incorporate a material whose transmission changes in response to applied voltage signals, the preferred material being an electrochromic material. In a first embodiment a white reference strip along the platen surface is exposed and the charge levels along discrete areas of the photoreceptor are measured by an electrometer with a plurality of probe segments. Outputs from each probe segment are processed in a control circuit and a signal sent to an appropriate mirror segment to increase or decrease reflectance to enable a corresponding decrease or increase, respectively, of the charge level, at the corresponding discrete areas of the photoreceptor illuminated by the mirror segments.

5 Claims, 2 Drawing Sheets

EXPOSURE CONTROL SYSTEM

BACKGROUND AND PRIOR ART STATEMENT

The present invention relates to an optical imaging system for an electrophotographic copying machine and more particularly to an exposure system in which the reflectivity of a scan mirror in the optical system controls the illumination level and illumination profile at the surface of a photoreceptor.

In electrophotographic copiers, a document to be reproduced is placed on a document platen and is incrementally illuminated by a light source such as a fluorescent lamp, which moves in a parallel path beneath the platen. The light is reflected by at least a scanning mirror and the reflected light image projected through a lens to expose a surface of a photosensitive image medium such as a drum or belt photoreceptor. The optical system generally incorporates one or more folding mirrors to enable a compact design. The surface of the photoreceptor has previously received a charge of a certain magnitude and polarity. The incident light discharges the surface leaving fully charged areas representing the informational areas of the document (write-white system). The latent image of the document thus formed is subsequently developed and transferred to an output medium such as plain paper. The goal in the production of the output print for a 1:1 copy is to make as exact a copy of the original document as possible. It is, therefore, desirable that the non-image areas of the photoreceptor which are exposed by the light experience a discharge to the same background level, e.g., achieve a uniform discharge level in all the illuminated areas.

The major source of non-uniform discharge is a non-uniform illumination level incident at the photoreceptor surface. The causes of non-uniform illumination are well known; the most significant being the fall-off in light at the ends of the image plane illumination profile caused by $cos^4$ variations created by the projection lens. Other causes of non-uniformity include the dark regions near the electrodes in a low pressure gas discharge, such as a fluorescent lamp. In a linear tungsten lamp, the unlighted sections between filiment sections also cause illumination non-uniformities. Lamp aging or deterioration effects during continuing operation also cause illumination non-uniformities along the lamp. Further causes of undesirable non-uniformities are contamination of the optical system by dirt and dust build-up on the lenses and mirror components. Various techniques have been employed in the prior art to compensate for these factors. The $cos^4$ fall-off is typically compensated for in scanning type systems by imaging light through a butterfly slit positioned adjacent to the photoreceptor surface, or through a slit integral with the lens. Other systems place a variable density filter into the light path, the filter designed to vary the transmission therethrough so as to provide for a uniform level of illumination to irradiate the photoreceptor surface. U.S. Pat. No. 4,298,275 describes characteristics of this type of filter. The effects of lamp aging are compensated for by, for example, the procedures described in U.S. Pat. No. 3,947,117. This patent discloses a detection of a portion of the illumination output level at a photoreceptor and generates a photosensor output which is used to vary the power to the illumination source. This technique changes the overall illumination and does not compensate for variation in illumination profile. Still other systems use specially shaped or positioned reflectors to compensate for lamp uniformity variations. These techniques introduce permanent corrections that can not compensate for dynamic changes in the profile.

Even after the above effects have been compensated for and a uniform irradiance level is obtained at the photoreceptor, yet the discharge of the illuminated portion of the photoreceptor surface may not be completely uniform. This additional non-uniformity is due to factors such as variations in the photosensitivity of the photoreceptor being used (which results in some areas discharging more or less than the other areas even through subject to the same light level), or variations in the initial "uniform" charge applied to the photoreceptor. This second group of factors are more subtle and difficult to compensate for than the non-uniform light profile factors. The present invention is directed towards modifying the optical system of a scanning type of copier by replacing an already existing mirror, or introducing a new mirror in an appropriate location in the optical path, the mirror being constructed of segments of an electrically sensitive material whose reflectance characteristics can be altered by applications of appropriate voltage. In a preferred embodiment, an electrochromic material that changes transmission in response to the applied voltage is overcoated on a mirror surface. Thus, the mirror functions as a segmented variable reflectance mirror in response to an applied voltage. The voltages applied to the mirror segments are derived in a first embodiment from a segmented electrometer which is positioned along the full width of the photoreceptor surface. The electrometer measures charge variations in discrete segmented exposed areas across the width of the photoreceptor. Each segment of the electrometer corresponds to one of the mirror segments. The variations in the charge levels as detected by the electrometer are compensated for by varying the reflectance of the associated mirror segments so as to vary the illumination profile. Variable reflectance non-segmented mirrors are known for other purposes, e.g., U.S. Pat. No. 4,603,946 and a publication High Technology Magazine, pg. 7, published July 1987. Both references disclose changing the reflectance of an auto rear view mirror for changes in ambient conditions.

More particularly, the invention related to a document imaging system wherein a document on a platen is scan/illuminated by a scan mirror and illumination lamp assembly and a document image is projected along an optical path to expose a charged surface of a photoreceptor resulting in a first charge level representing the document information and a second charge level representing exposed background areas;

an exposure control system comprising in combination an electrometer positioned adjacent the surface of said photoreceptor substantially extending along its width, said electrometer comprising a plurality of segmented probes, each probe adapted to sense the background charge level of a discrete area of the photoreceptor surface lying therebeneath and to generate an output signal representative of the charge level of said discrete area, a variable reflectance mirror fixedly positioned along said optical path, said mirror having a plurality of segments whose reflectance varies in accordance with a voltage applied thereto, and a control circuit for comparing the output signals from said electrometer segments with a reference signal representative of an optimum, or uniform discharge level, and for applying output signals at appropriate voltage levels to corresponding mirror segments whereby the reflectivity of the addressed mirror segment is selectively increased or decreased to cause a decrease or increase, respectively, in said discrete background areas.

For certain systems adequate performance may be achieved by compensating for the light non-uniformities of the light source at the image plane surface. According to a second embodiment of the invention a linear array of photodetectors (rather than the electrometer) is located along the photoreceptor width at the surface. Signals from each individual photosensor are then processed and sent to control the reflectivity of the corresponding mirror segments.

IN THE DRAWINGS

DESCRIPTION OF THE INVENTION

Figure 1:
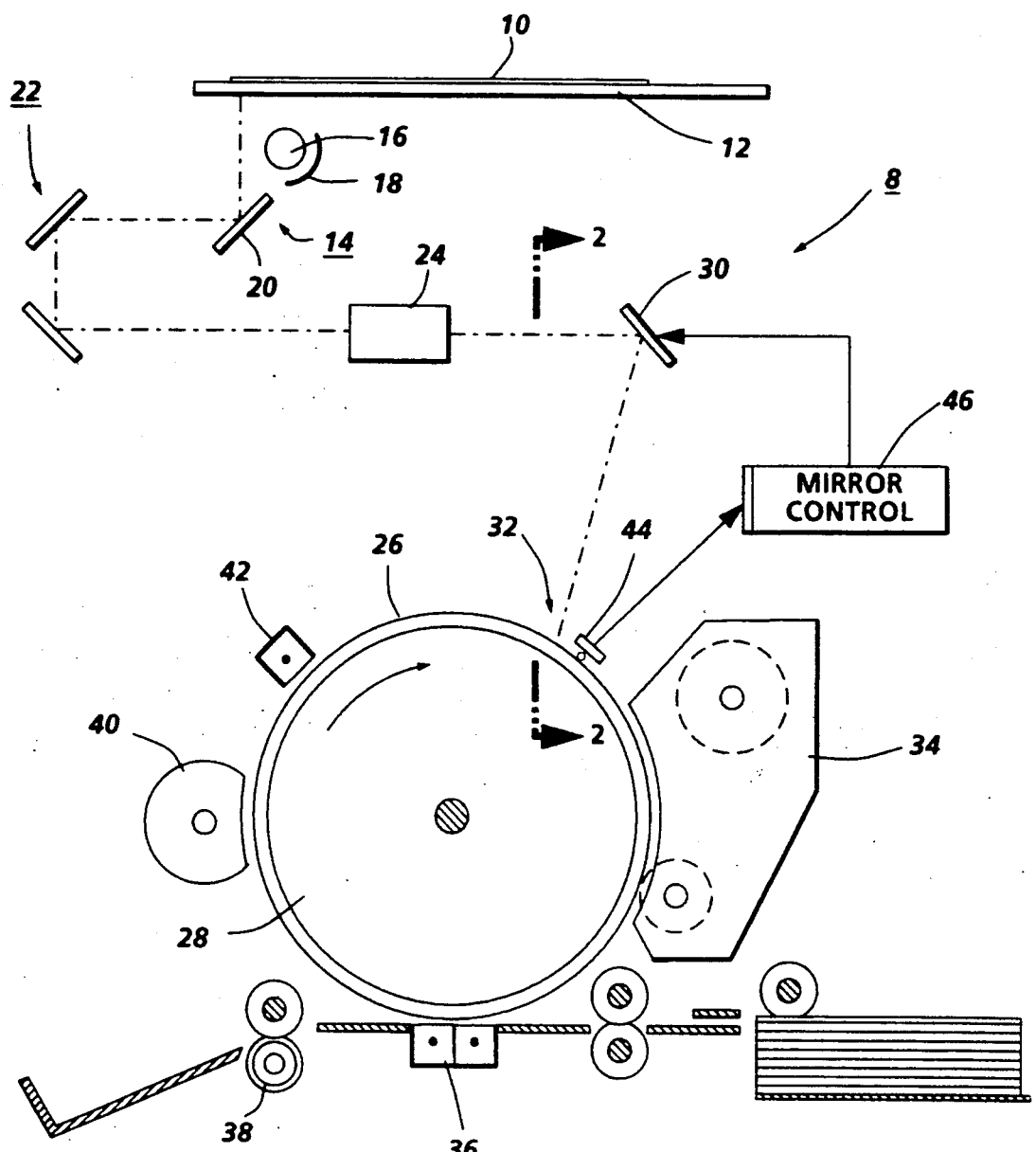
FIG. 1 shows a side schematic view of a document imaging system incorporating the variable reflectance mirror of the present invention.

Referring now to FIG. 1, there is shown an electrophotograpahic copying system 8 wherein a document 10 to be copied is placed on the surface of a transparent platen 12. A scanning assembly 14 consisting of a lamp 16, associated reflector 18, and scan mirror 20 are mounted for parallel movement along a scan path beneath and parallel to platen 12. Half-rate mirror assembly 22, adapted to travel at ½ the rate of mirror 20, reflects line images of the document into projection lens 24. Lens 24 projects a flowing image of the document onto the surface 26 of drum 28 via a variable reflectance folding mirror 30 having a plurality of electrochromic segments elements 30A-30N placed between a mirror 62 and a glass plate 64. Further details of construction and operation of the mirror are provided below. The projected image is incident at the drum surface along exposure strip 32. Arranged around the drum 28 are conventional xerographic processing stations: a developing station 34 for applying a toner of suitable plurality to the latent image formed on the drum surface; a transfer station 36 for transferring the developed image to an output sheet; fusing station 38 for fixing the transferred image to the copy sheet; a cleaning station 40, and a charging station 42 for applying a uniform charge to the drum surface.

Adjacent the drum, and downstream from the exposure strip 32 is a segmented electrometer 44 extending the width of the drum surface. Output signals from electrometer 44 are sent to mirror 30 via a mirror control circuit 46 which is described in further detail below.

According to a first aspect of the invention, the system is periodically tested to determine whether the photoreceptor surface is being discharged to some predetermined optimum uniform level (background level). The test is conducted during a prescan mode in which a white reference strip 60, located along the width of the platen in a park position outside of the image scan area, is illuminated. A corresponding strip along the width of the photoreceptor is thus illuminated and discharged. Discrete discharge areas of the photoreceptor are then measured by electrometer 44.

Figure 4:
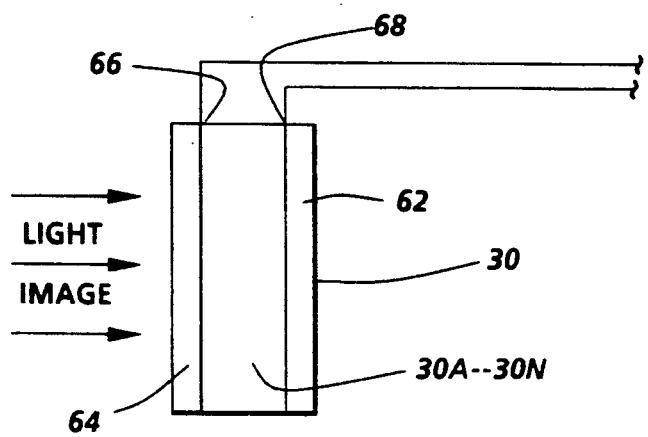
FIG. 4 shows an end view of the mirror shown in FIG. 1.
Figure 2:
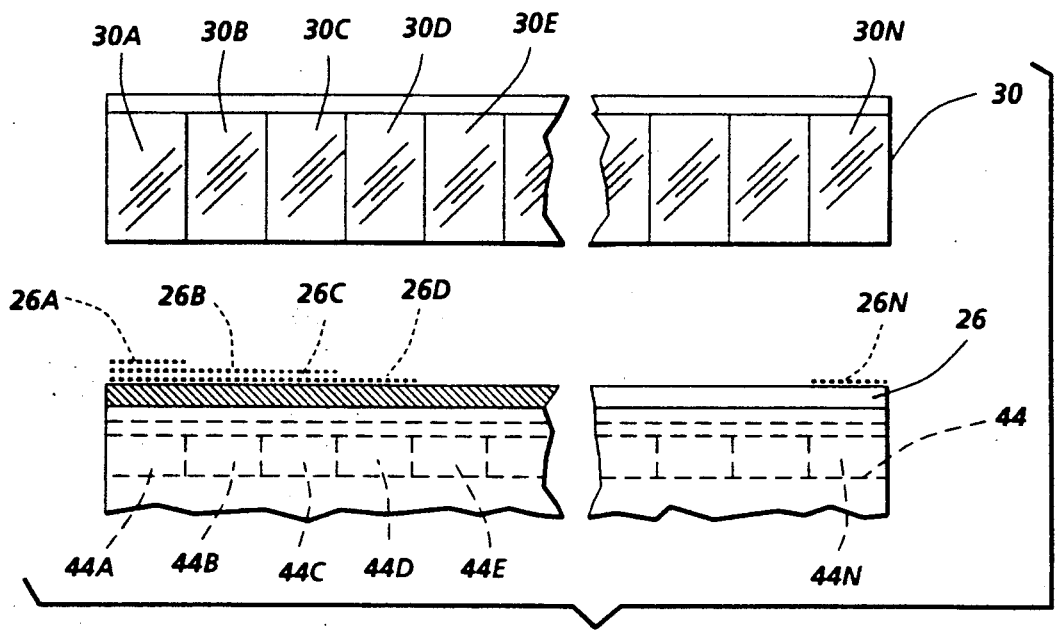
FIG. 2 is a view of a portion of the imaging system of FIG. 1 through section 2—2 showing the variable reflectance mirror and the position of the electrometer adjacent to the surface of the photoreceptor drum and further showing a non-uniform charge level on the photoreceptor.
Figure 3:
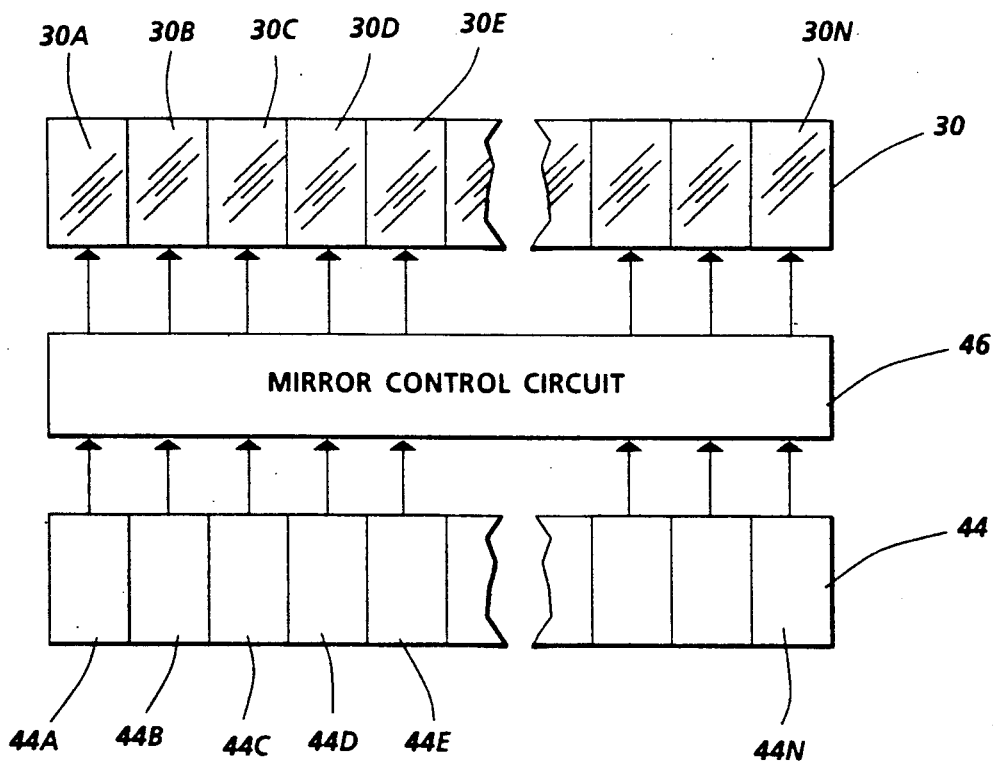
FIG. 3 shows the electrical connections between the electrometer and the variable reflectance mirror as controlled by a mirror control circuit.

Referring now to FIGS. 2 and 4, further details of the segmented electrometer 44 output feedback to the segmented variable reflectance mirror 30 are provided. FIG. 2 is a partial sectional view of FIG. 1 through section 2—2. Mirror 30 is seen to comprise a plurality of segments 30A-30N sandwiched between a mirror plate 62 and a glass substrate 64 (FIG. 4). Electrometer 44 is comprised of a series of probe segments 44A, 44N. Electrometer 44 is positioned adjacent surface 26 of photoreceptor 28 with each probe segment 44A to 44N sensing the charge on discrete areas 26A-26N of the surface beneath the probe.

For purposes of description, FIG. 2 shows four discrete charge areas 26A, 26D on surface 26. For this example, each surface 26B, 26C has been discharged to a desired background level, but areas 26A is at too high a level indicating a need for a greater amount of illumination to fall on that area, while area 26D is at too low a light level indicating that a lesser amount of light is needed to increase the charge level. Electrometer probe segments 44A-44D sense the charge levels at areas 26A, 26D. The output signals from these probes are sent to mirror control circuit 46 which compares the signal to a reference signal corresponding to an optimum charge level. Signals for those segments indicating a non-optimum charge level (segments 44A, 44D) result in generation of output voltage signals sent to mirror segments 30A, and 30D and applied across electrode 66, 68. (For this example mirror segments 30B, 30C do not require a change in their (transmissivity). When the probe signals are applied, the reflectance of mirror segment 30A is increased, more light falls on surface area 26A and the charge level is reduced to the level of area 26B, 26C. The voltage applied to mirror segment 30D decreases the reflectivity of this segment and less light falls on area 26D so as to increase the charge level to bring it to the desired background level. It is obvious that similar charge measurements occur at the remaining surface areas 26E, 26N as measured by electrometer segments 44E, 44N with corresponding signals sent to mirror segments 30E to 30N.

Summarizing the above operation, at specified intervals a test scan is made of reference strip 60 and the charge along discharge strips 26A-26N is measured. Areas of the charge not at the desired discharge level are detected and appropriate voltage signals are applied to the corresponding mirror segments to increase or decrease transmission so as to bring the charge levels for all the segments to a desired optimum level. Normal copying operations can then be initiated.

FIG. 4 shows a side view of mirror 30. As shown, the mirror is formed of a core of segments 30A-30N sandwiched between a mirror 62 and a glass substrate 64. Signals are applied to electrodes 66, 68 formed on both surfaces of the segments. Electrodes 66, 68 are segmented with each segment providing electrical connections to a corresponding mirror segment. Mirror segment elements 30A-30N are formed of an electrochromic material having a transmission which varies in response to the applied voltages. A voltage level ranging from 0.4 to 1 volt is adequate to produce the required reflectivity variations in the electrochromic material.

According to a second embodiment of the invention, the electrometer 44 of FIG. 1 can be replaced by a linear segmented photodiode array. The operation is the same as for the first embodiment with the photodiode arrays signal generating the signals sent to control circuit 46. This embodiment provides compensation for non-uniform illumination at the photoreceptor surface, e.g., lamp variations, cos$^4$ variations and lens non-uniformities, as well as contamination of the optical system. The embodiment does not compensate for photoreceptor variations and charging variations, and thus is not as precise a compensation system as the first embodiment. The system may, however, be adequate for some systems with wider tolerance latitudes, and low cost requirement.

Although the mirror segments in a preferred embodiment are formed of electrochromic material, other materials which change transmission with voltage changes may be suitable; for example, liquid crystal cells of the type disclosed in U.S. Pat. No. 4,527,864 may form the variable transmission elements of the mirror segments.

While the invention has been described with reference to the structure disclosed, it will be appreciated that numerous changes and modifications are likely to occur to those skilled in the art, and it is intended to cover all changes and modifications which fall within the true spirit and scope of the invention.

I claim:

1. A document imaging system wherein a document on a platen is scan/illuminated by a scan mirror and illumination lamp assembly and a document image is projected along an optical path to expose a charged surface of a photoreceptor resulting in a first charge level representing the document information and a second charge level representing exposed background areas;

an exposure control system comprising in combination an electrometer positioned adjacent the surface of said photoreceptor substantially extending along its width, said electrometer comprising a plurality of segmented probes, each probe adapted to sense the background charge level of a discrete area of the photoreceptor surface lying therebeneath and to generate an output signal representative of the charge level of said discrete area, a variable reflectance mirror fixedly positioned along said optical path, said mirror having a plurality of segments whose reflectance varies in accordance with a voltage applied thereto, and a control circuit for comparing the output signals from said electrometer segments with a reference signal representative of an optimum or uniform discharge level, and for applying output signals at appropriate voltage levels to corresponding mirror segments whereby the reflectivity of the addressed mirror segment is selectively increased or decreased to cause a decrease or increase, respectively, in said discrete background areas.

2. The imaging system of claim 1, wherein said variable reflectivity segments include an electrochromic material.

3. The imaging system of claim 1, wherein said variable reflecting segments are composed of a liquid crystal.

4. An exposure control system for an electrophotographic reproduction machine including, in combination, a scanning optical system having a periodically enabled prescan mode, said optical system including a scan mirror, an illumination lamp assembly adapted to scan/illuminate a document on a document platen and project a light image onto a moving photoreceptor surface, an electrometer positioned adjacent the surface of said photoreceptor substantially extending along its width, said electrometer comprising a plurality of segmented probes each probe adapted to sense the charge level of a discrete area of a photoreceptor surface lying therebeneath and to generate an output signal representative of said charge level, a variable reflectance mirror fixedly positioned along said optical path, said mirror having a plurality of segments containing a material whose reflectivity varies in accordance with voltage applied thereto, and a control circuit for comparing output signals from said electrometer probes with a reference signal representative of an optimum illumination level at the photoreceptor surface, and applying appropriate voltage levels to the mirror segments corresponding to the electrometer probe outputs whereby the reflectivity of the mirror segments is selectively increased or decreased to reduce or increase illumination, respectively, at the corresponding discrete areas of the photoreceptor.

5. An exposure control system for an electrophotographic reproduction machine including in combination, a scanning optical system having a periodically enabled prescan mode, said optical system including a scan mirror, an illumination lamp assembly adapted to scan/illuminate a document on a document platen and project a light image onto a moving photoreceptor surface, a linear segmented photosensor array positioned adjacent the surface of said photoreceptor substantially extending along its width, said array comprising a plurality of photosensors, each sensor adapted to sense the charge level of a discrete area of a photoreceptor surface lying therebeneath and to generate an output signal representative of said charge level, a variable reflectance mirror fixedly positioned along said optical path, said mirror having a plurality of segments containing a material whose reflectivity varies in accordance with voltage applied thereto, and a control circuit for comparing output signals from said linear photosensor array with a reference signal representative of an optimum illumination level at the photoreceptor surface, and applying appropriate voltage levels to the mirror segments corresponding to the photosensor array output whereby reflectance of the mirror segments is selectively increased or decreased to reduce or increase illumination, respectively, at the corresponding discrete areas of the photoreceptor.

* * * * *